United States Patent Office 3,450,738
Patented June 17, 1969

3,450,738
FLUOROORGANO SILICON COMPOUNDS
Walter Blochl, Karlsruhe, Germany, assignor to FMC Corporation, New York, N.Y., a corporation of Delaware
No Drawing. Filed Sept. 9, 1965, Ser. No. 486,208
Claims priority, application Germany, Sept. 12, 1964, B 78,510; May 7, 1965, B 81,814
Int. Cl. C07f 7/18; D06m 13/00
U.S. Cl. 260—448.8    6 Claims

ABSTRACT OF THE DISCLOSURE

Fluoroalkyl silicon compounds, useful as stain repellents and having the formula $$(RR')_m R''_n SiZ_{4-(m+n)}$$

in which R is $X(CF_2)_p-$, where X is hydrogen, chlorine or fluorine and $p$ is 6–18, R' is $-(CH_2)_q-$, $$-CH=CH-$$

or $-C_3H_6OC_3H_6-$, where $q$ is 2–6, $m$ is 1–2, R'' is lower alkyl or lower alkenyl, $n$ is 1–2, Z is an organooxy group derived from an aliphatic hydroxy compound selected from the class consisting of a glycol, a glycol ether, a polyol, a polyol ether, a hydroxycarboxylic acid and an alkanolamine are described.

---

The present invention relates to the preparation of flouoroalkyl silicon compounds and impregnating agents for obtaining anti-adhesive, oil-repellent and water-repellent properties on textiles, yarns, filaments and fibers of all kinds, paper, leather, varnish, wood and plastic, cellulose and cellulose derivative sheets and films, as well as the applications thereof.

For some time past, aqueous emulsions and non-aqueous solutions of fluoroalkyl resins have been used for the oil-repellent, dirt-repellent and water-repellent impregnation of textiles, filaments, yarns, as well as leather, paper wood, plastic sheets, varnished surfaces and metallic surfaces. For economic and hygienic reasons, aqueous emulsions are preferably used, since the use of the required large amounts of solvents is expensive, liable to cause fire and detrimental to health. However, these resin emulsions are extremely sensitive; during practical operations, there often occur flocculations and precipitations, which are caused by impurities or changes in pH. In adidtion, it is very difficult to use an economically desirable single-bath impregnation since the additional finishing additives, for example creaseproof finishing agents, very often precipate the emulsion or render it more sensitive to flocculations and precipitations. The emulsions age quickly, and it is often impossible to maintain the baths for more than two days. Another disadvantage of said emulsion is the frequent occurrence of spoiled material formed by being pulled through the bath during the unobserved flocculation process and which thereby becomes unattractive and cannot be cleaned. When there are irregularities in the material, the emulsion often is applied unevenly and this becomes visible when the fabric is used. Known emulsions used for impregnating purposes have a strong oleophobic effect, but only a mild hydrophobic effect. When water-repellent agents are added, the oleophobic effect of said emulsions is diminished, so that it was difficult to obtain optimal hydrophobic and oleophobic effects at the same time in the past.

The impregnating agents of the present invention are water-soluble and therefore are more convenient to use than the previously known sensitive emulsions. These impregnating agents are also soluble in organic solvents such as trichloroethylene which allows the use of the impregnating agents with Freon as the propellant gas in aerosol spray containers for small consumers. The above-described impregnating agents impart to the substrate an extremely high anti-adhesive, oil-repellent, dirt-repellent and water-repellent property and render it highly washproof. Substrates treated in this manner do not become discolored.

Although a number of fluoroalkyl silicon compounds are known in the art, only compounds containing more than 5 $CF_2$-groups at the free end of the alkyl group have this impregnating effect to a sufficiently high degree. The most efficient compounds are silicon compounds containing alkyl groups having no fluorine in the alpha- and beta-position to the silicon and at the other end a perfluoroalkyl group having 8 to 14 carbon atoms. If such mono-alkyltrichlorosilanes or dialkyldichlorosilanes are reacted with concentrated aqueous ammonia, pure aqueous solutions, which can be used very economically due to the elimination of measures for recovery and the cost of the solvents, are obtained. Fluoroorganoalkoxysilanes and fluoroorganoacetoxysilanes or fluoroorganopropionylsilanes can also be used advantageously in trichloroethylene solution or in other solvents, unless the use of non-aqueous solvents is of greater advantage in certain cases.

Fluoroorganoalkoxysilanes, which are obtained from polyglycols, ethanolamines, propanediol amines and their salts, glycerin or glycidol, can be used extremely easily as water-soluble or hydrophilic impregnating agents and, possibly, without organic solvents. These preferred impregnating agents form genuine aqueous solutions which produce an extremely high oleophobic and hydrophobic impregnating effect on many kinds of substrates and which are completely insensitive to the customary impurities and to sizable pH-fluctuations. Even without additives, these solutions have a high wetting power. They may simultaneously be used as wetting agents when applying other finishing agents admixed thereto. This property is particularly important in the case of thick textiles and leather to make economical and uniform absorption possible.

The impregnating bath according to the preferred invention is an aqueous or aqueous-alcohol solution of a fluoroalkylalkoxysilane, which contains one or, at most, two fluorinated alkyl radicals and, possibly, one to two smaller hydrocarbon radicals connected to silicon. One to three aliphatic polyols, polyethers, alkanolamines, hydroxycarboxylic acids, as well as their polyol or polyether esters are connected to the silicon, linearly or cyclically, by way of oxygen atoms, in the manner of an alkoxysilane. Despite the required long fluoroalkyl radical, which is connected to silicon, such fluoroalkylalkoxysilanes unexpectedly are still water-soluble and surface active. Another completely surprising property of such aqueous solutions is their extraordinary stability against the precipitation of polysiloxane, since hydrolysis and condensation normally occur in homogeneous alkoxysilanes in the presence of water. It is this property which makes it possible to use aqueous fluorosilicon solutions economically in practice. No precipitation or flocculation from aqueous solutions of fluoroalkylalkoxysilanes, which contain two to three alkoxy groups of the type described above, was observed, even weeks and months later, although—according to past experience with the behavior of alkoxysilanes—the equilibrium should be entirely on the silanol or polysiloxane side; this should be especially true of the trifunctional mono(fluoroalkyl)trialkoxysilanes. This unexpected stability makes it possible to impregnate substrates, economically, from aqueous solutions with trifunctional fluorosilicons, which can be bonded to the fiber in washproof manner after an adequate storage time or after brief heating. This stability can possibly be explained by a weak saturation of the secondary valences of the coordinatively hexavalent silicon atom, by the heteroatoms which are contained in the alkoxy groups and which then act as electron donors with respect to the silicon. Alkoxy groups, especially effective for this purpose, are 1,2- and 1,3-glycols and the linear polyethers synthesized therefrom, specifically ethylene glycol, diglycol, triglycol and polyglycol, as well as amino alcohols, specifically mono-, di- and triethanolamine, as well as glycolic acid and hydroxypropionic acid and the derivatives thereof. Among the polyols, glycerin is worth mentioning.

These stable aqueous or aqueous-alcohol fluorosilicon solutions are obtained by dissolving fluoroalkylalkoxysilanes, which are obtained by the reaction of $$[R_fR']_m[R'']_nSi[Z]_{4-(m+n)}$$

wherein:

$m=1$ to 2, preferably 1;
$n=0$ to 2, preferably 0 and 1;
$m+n=1$ to 3;
Z=halogen, sulfur, nitrogen, hydrogen, acyl or alkoxy radical, preferably chlorine, acetyl or methoxy radical;
R''=lower hydrocarbon radical, preferably an alkyl such as methyl or an alkenyl such as vinyl;
$R_f=X(CF_2)_n$— ($n=6-18$, preferably 7 to 14; X=H, Cl, Br, preferably F, a portion, but not more than one half, of the —$CF_2$— groups can be substituted by —CFCl—); and
R'=a divalent organic radical having two or more carbon atoms, preferably —$CH_2CH_2$—, —CH=CH—, —$(CH_2)_6$—, or —$C_3H_6O$—$C_3H_6$—, with aliphatic hydroxy compounds, which are listed below:

1,2-glycols, specifically ethylene glycol, their half-esters and half-ethers;
1,3-glycols, specifically 1,3-propane-diol, their half-esters and half-ethers;
polyols, specifically glycerin, diglycerine, and their partially esterified and partially etherified derivatives;
hydroxycarboxylic acids, specifically glycolic acid, hydroxypropionic acid, their glycolic and polyglycolic esters and ethers and their salts, nitriles or amides;
alkanolamines, and their polyglycol ethers, specifically mono- and diethanol amine;
polyethers, specifically diethylene glycol, triethylene glycol and polyethylene glycol, in which case the free hydroxyl groups after the silanol esterification can be etherified or esterified, in all compounds, by small alkoxy groups or acyl groups. The half-esters and half-ethers of these polyethers may also be used.

As is apparent from the above list, hydrolysis-resistant fluoroalkyloxysilanes can be obtained only by using esterification components which comprise at least one alcoholic hydroxyl group for the esterification and, in addition, in the two-position to four-position, a heteroatom with electron-donor property, especially oxygen, aminonitrogen or nitrile nitrogen. Best results are obtained with the esterification products from glycol, diglycol, triglycol, low polyglycols and ethanolamines. Such esterification products derived from fluoroalkyltrichlorosilanes of the formulae:

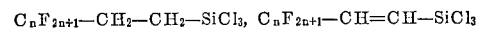
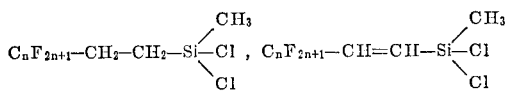

wherein $n=7$ to 14 produce excellent stable solutions, which, in a concentration of 5% down to 0.1% and less, produce a good oleophobic as well as strongly hydrophobic impregnating effect.

The impregnating agents of this invention are obtained by addition of 1-iodo-perfluoroalkanes having more than 5 carbon atoms, which may also contain a chlorine or hydrogen atom in the omega-position, on unsaturated organo-silicon compounds, specifically on vinyltrichlorosilane, vinylmethyldichlorosilane, divinyldichlorosilane, $$CH_2=CH(CH_2)_4SiCl_3$$

vinyltrialkoxysilane, or vinylmethyldialkoxysilane, thermally or under conditions of free radical formation, as well as under irradiation with ultraviolet light. Advantageously, the organically bound iodine is subsequently removed by reduction with metals, such as zinc shavings, sodium amalgam, amalgamated aluminum or aqueous $NaHSO_3$-solutions or by catalytic hydrogenation in the presence of hydrogen halide acceptors, according to a procedure known per se to form fluoroalkylsilanes of the formula $$CF_3Y(CF_2)_n(CH_2)_m\underset{X}{\overset{X}{Si}}X$$

in which X is chlorine, alkyl or alkoxy, Y is fluorine, chlorine or hydrogen, $m$ is 2 to 6 and $n$ is at least 5. The iodine ion may also be removed from the aqueous solutions by precipitation or by means of an anion exchange resin, for example, with Dowex 2-X8 of the Dow Chemical Co., or else, the resulting fluoroorganosilicon compounds are extracted with trichloroethylene from the aqueous solution wherein all inorganic components remain, whereupon the substances are again converted into their aqueous solutions by evaporation of the solvent in admixture with water.

A second very useful method of preparing fluoroorganosilicon impregnating agents comprises the addition of fluoroalkenes, fluoroalkines or fluorinated unsaturated ethers to silicon compounds and polysiloxanes or cyclosiloxanes which contain Si-H-bonds by using catalysts known to be suitable for the addition of unsaturated organic compounds on Si-H-bonds, such as, for example, platinum, chloroplatinic acid or amines, or amine complexes of heavy metals. Ultraviolet light, gamma-rays or temperatures in excess of 200° C., as well as catalysts which decompose into radicals, such as ditertiarybutylperoxide can be used for carrying out the reaction. The fluoroalkenes or -alkines especially suited for this purpose are the following compounds, wherein $n$ is greater than 5, particularly wherein $n=7$ to 15 and $m=0$ to 4:

$$CF_3(CF_2)_n(CH_2)_mCH=CH_2$$
$$CF_3(CF_2)_nC\equiv CH$$
$$CF_3(CF_2)_nCH=CHSiCl_3$$
$$CF_3(CF_2)_n(CH_2)_4CH=CH_2$$

but the readily obtainable unsaturated fluorinated ether $$CF_3(CF_2)_n(CH_2)_3OCH_2CH=CH_2$$

can also be added analogously. If one uses trialkoxysilane, methyldialkoxysilane, cyclic or linear hydrogenmethylpolysiloxanes, the resulting compounds of the formula $$CF_3(CF_2)_n(CH_2)_m\underset{OR}{\overset{OR}{Si}}R'$$

in which R is alkyl, R' is alkyl or alkoxy, $m$ is 2 to 6, and $n$ is greater than 5 and preferably 7-15, and the corresponding fluoroalkylsiloxanes can be used directly as impregnating agents.

According to the invention, the preferred fluoroalkylalkoxysilanes, necessary for preparing the aqueous solutions, are best obtained by reacting the corresponding chlorosilanes or hydrogensilanes or by transesterification of other available alkoxysilanes with the ester components according to a method known per se. The fluoroalkylsilicon compounds required for this purpose are obtained appropriately according to U.S. application Ser. No.

455,615, filed May 13, 1965, now abandoned, or the method described above. These compounds frequently contain organically bound iodine, which can be exchanged for hydrogen by reduction with sodium amalgam in methanol solution or with zinc in hydrochloric acid solution or ammonium bromide or ammonia-containing alcoholic solution. The de-iodizing stage may take place after the chlorosilanes have been reacted with methanol to be converted into methoxy silanes, which are subsequently catalytically transesterified with the esterification components, or else, the chlorosilanes are reacted at once with the esterification components, whereupon the reduction is carried out. However, the latter method offers greater difficulties in the separation of the inorganic iodides, which must then be removed by dialysis or by means of ion exchangers or by precipitation reaction to recover the iodine.

It is expendient to start from fluoroalkylchlorosilanes which, if prepared according to U.S. application Ser. No. 455,615, contain, in addition to the iodine-containing product, olefinic silane, which originates from the primary product by the splitting-off of HI. This olefinic fluoroalkylchlorosilane also leads to products of similar effectiveness and is thus left in the reaction mixture. These chlorosilanes are now dissolved in diisopropyl ether and are added, slowly and drop by drop, under cooling and vigorous stirring, to a greater excess of methanol, which contains an excess of liquid sodium amalgam. After the chlorosilane has been added, the resulting methoxy-silane is stirred intensively for half an hour to two hours with sodium amalgam at room temperature to 60° C. The solution separated from the amalgam is then neutralized with gaseous HCl, water is added, extraction is carried out by vigorous shaking, whereupon an aqueous phase with all inorganic salts, such as iodides, can be separated, while the ethereal solution contains the fluoroalkyl-methoxysilanes free of iodine. This solution is dried with $CaCl_2$, and the solvent is distilled off. This residue is now mixed with the above-described esterification components, some tetrahydrofurane is added expediently as a dissolving intermediary, and a catalytic amount of sodium methoxide, benzyl trimethyl ammonium hydroxide or p-toluene sulfonic acid is added. The mixture is now heated to 70–150° C. or 50–80° C. for about 1 to 5 hours. The methanol which forms later, together with the tetrahydrofurane, may be allowed to distill off. After this transesterification, a cooled sample of this mixture is completely soluble in water and can be used for the preparation of the aqueous impregnating bath.

A third possible method is the reduction of chlorosilane in ethereal solution with lithium aluminum hydride, in which case the organically bound iodine is exchanged for hydrogen. A temperature of 34° C. and a reaction time of ½ hour are sufficient for this reduction. After a little $H_2PtCl_6$ has been added, the silane can now be reacted with the esterification components, which again produces fluoro alkylalkoxysilanes, which are suitable for preparing aqueous impregnating solutions. One-tenth gram to 50 g. of these fluoroalkylsilicons are dissolved in 1 litre of water. A small amount of lower alcohols may be contained in the water. This solution is stable and is largely insensitive against pH-fluctuations. The pH should advantageously range between 2 and 9, which can be obtained, if necessary, by using ammonia acetate as buffer. It is of advantage to admix with the halosilanes, prior to impregnation, a tertiary amine or pyridine as hydrochloric acid acceptor. The fluoroorganohalosilanes can be reacted particularly easily with aqueous ammonia to form water-soluble impregnating agents. The substrates are wetted, saturated, immersed, sprayed or painted with dilute solutions having a concentration between 0.1 and 3% of fluoroorganosilicon compounds. Textiles, yarns, leather, paper and plastic sheets can be saturated or sprayed with these solutions or can be coated therewith by means of rollers. In order to fix the solution more quickly on the substrate, the drying is followed by a short tempering at temperatures between 80° C. and 180° C. up to 15 minutes, depending on the sensitivity of the substrate. Thus, fluoroorganopolysiloxanes which are chemically anchored to or interlaced with the substrate by way of Si-O bridges are produced on the substrate, possibly by using a transesterification catalyst for alkoxysilanes. The substrates are advantageously heated to about 120–150° C. for a few minutes; this will produce very stable oleophobic and hydrophobic surface properties.

Substrates impregnated in this manner show excellent water-repellent and hydrocarbon-repellent properties. Varnished surfaces impregnated in this manner can be cleaned easily. Films made of cellulose regenerate, for example, cellophane sheetings, can be coated anti-adhesively in this manner with a pressure roller on one side and will then be suited for the covering of adhesive films. The reverse side of adhesive strips made of films or textiles which have been treated in this manner, no longer stick to the adhesive side when the adhesive strip is rolled up, even at a high storage temperature. Papers impregnated in this manner soil very little when used. Wooden articles saturated in this manner no longer absorb oil or water and do not become dirty. Suede articles are no longer so sensitive to stains and can easily be cleaned. Owing to the anti-adhesive properties, sewing yarns slide through cloth and through the eye of a needle more easily. The solutions may also be used as mold release agents for plastic, wood or metal molds.

EXAMPLE 1

4.5 g. of vinyltrichlorosilane were mixed with 15 g. of 1-iodo-perfluoro octane; this solution in a liquid layer 3 mm. thick was irradiated in a Pyrex glass vessel at a distance of 10 cm. with a 500 watt mercury vapor lamp for 30 hours with agitation of the solution and exclusion of oxygen. The resulting fluoroiodoalkyltrichlorosilane was dissolved in 50 cc. of anhydrous tetrahydrofurane, and this solution was added dropwise to 200 cc. of concentrated aqueous ammonia solution with cooling and stirring. This solution was diluted to 700 cc. with aqueous ammonia; a piece of cotton cloth was then saturated with this solution, squeezed out, dried and heated to 110° C. for 5 minutes. Water, paraffin oil, peanut oil, heptane and gasoline trickled off this cotton cloth in the form of beads. This effect did not disappear, even after the cloth had been washed repeatedly. Rubbed-on dirt could readily be removed by washing in cold water.

EXAMPLE 2

100 cc. of the concentrated aqueous ammoniacal impregnating solution prepare daccording to Example 1 were shaken with 20 g. of zinc shavings for 1 hour. The nonconsumed zinc was separated, and this solution, having been diluted with water, was successfully used for impregnating, as described in Example 1.

EXAMPLE 3

100 cc. of the solution obtained according to Example 2 were passed very slowly, prior to being diluted, through a column with 50 g. of the strongly basic, chloride-charged anion exchange resin Dowex 2X8 of the Dow Chemical Co., for the removal of iodide and were subsequently diluted with aqueous ammonia solution to form an 0.5% impregnating solution. A piece of filter paper, a piece of linen and a piece of cellophane were dipped into the aqueous impregnating solution, then dried and subsequently heated to 90° C. for about 5 minutes. All pieces thus treated showed a strongly anti-adhesive, oil-repellent and water-repellent effect. The cellophane sheet could no longer be firmly bonded to any of the commercially available adhesive films and could be detached therefrom at any time.

EXAMPLE 4

The concentrated fluorosilazane ammonia solution obtained according to Example 2 was shaken out with the same amount of trichloroethylene, and the trichloroethylene solution was dried over a small amount of sodium sulfate. This trichloroethylene solution was further diluted with trichloroethylene to a content of 2% fluorosilicon and filled into an aerosol spray container, and Freon 114 was pressed in as propellant gas. The solution was then sprayed onto a piece of linen, a piece of suede and a leather glove which were dried in the normal manner. After 24 hours, all pieces thus treated showed a strong oil-repellent and water-repellent effect. Peanut oil trickled off in the form of beads, the gloves hardly soiled when used and could be cleaned easily with soapy water.

EXAMPLE 5

The trichloroethylene solution prepared according to Example 4 was emulsified, prior to further dilution, with concentrated aqueous ammonia in water, and the trichloroethylene was expelled with the vapor of an aqueous ammonia solution under a weak vacuum at 40° C. The residue was an aqueous, ammoniacal fluorosilicon solution which, after being diluted with water, could be used for impregnating sensitive textiles.

EXAMPLE 6

4 g. of vinylmethyldichlorosilane and 15 g. of 1-iodoperfluorooctane were irradiated for 30 hours, as described in Example 1. The resulting fluoroalkylmethyldichlorosilane was added, drop by drop, to 100 cc. of anhydrous ethanol. This solution was shaken with 30 g. of zinc shavings and 20 g. of ammonium chloride for 2 hours. Thereafter, the solution was mixed with 200 cc. of water and 200 cc. of trichloroethylene and shaken, and the trichloroethylene solution was separated. To this trichloroethylene solution were admixed 5 g. of methyltributoxysilane and 2 g. of trioctylamine and an additional 600 cc. of trichloroethylene. A piece of cotton poplin was dipped into this solution, squeezed out, dried, and ironed for some time with an iron set at a temperature of 180° C. Liquid drops of heptane, benzene, water or oil did not penetrate this fabric.

EXAMPLE 7

4 g. of vinyltriethoxysilane and 15 g. of 1-iodoperfluorodecane were dissolved in 50 cc. of diisopropyl ether; this solution, to which 0.3 g. of azobis(isobutyronitrile) was added, was slowly heated to 70° C. with stirring and exclusion of oxygen by nitrogen blanketing and was kept at this temperature for 12 hours. 0.3 g. of azobis(isobutyronitrile) was added twice, and the solution was kept at 70° C. for 8 hours. 100 cc. of ethanol were then added, and the solution was shaken thoroughly for 1 hour with 1.5 kg. of 0.2% sodium amalgam, the solution being kept on weakly acid by the introduction of HCl gas. After the amalgam had been separated, 200 cc. of trichloroethylene and 200 cc. of water were added. To the trichloroethylene solution separated from the aqueous layer were added 1 g. of trimethylbenzyl ammonium hydroxide and 1 g. of dodecylamine. A piece of paper impregnated with this solution, which had been dried at 120° C. for 5 minutes, showed oil-repellent and water-repellent properties. It showed no stains on contact with grease or oil.

EXAMPLE 8

5 g. of vinyltriacetoxysilane (vin-Si(OCOCH$_3$)$_3$), together with 10 g. of iodoperfluoroheptane in 20 cc. of diisopropyl ether, were irradiated for 24 hours in an annular vessel with a 500 watt high-pressure ultraviolet mercury lamp with exclusion of oxygen. The liquid layer amounted to 2 mm.; the distance from the lamp was 10 cm. After 20 cc. of glacial acetic acid had been added, the solution was passed through 1 kg. of 0.2% sodium amalgam for a prolonged period of time. After the amalgam had been removed, all solvents were evaporated in vacuo over a short column. The resulting residue amounted to 11.5 g. of

$$CF_3(CF_2)_6C_2H_4Si(OCOCH_3)_3$$

Trichloroethylene solutions of this substance were used to impregnate, in the cold state, all textiles producing a water-repellent and oil-repellent effect.

EXAMPLE 9

5 g. of the fluoroalkyltriacetoxysilane prepared according to Example 8 were dissolved in 100 cc. of tetrahydrofurane. A cellophane film was coated on one side with this solution by means of a printing machine having a smooth printing cylinder. After travelling through a drying zone at 80° C. for 20 seconds, the film was water-repellent and oil-repellent on the coated side and was so strongly anti-adhesive that it was suitable for use in the production of an adhesive strip which could be easily unwound, since the anti-adhesive reverse side of the strip separated readily from the adhesive side.

EXAMPLE 10

5 g. of the fluoroalkyltriacetoxysilane obtained as per Example 8 were dissolved in 50 cc. of tetrahydrofurane, and 5 g. of glycidol.

(CH$_2$CHCH$_2$OH)

were added to the solution dropwise with stirring. The entire solvent and the acetic acid which formed were distilled off quickly in water jet vacuum at 60° C., and the residue was mixed with 50 cc. of trichloroethylene. 0.5 g. of tributylamine were added, whereupon the solution was used to impregnate a piece of leather and a piece of fabric. After being dried and heated to 60° C., the two test pieces had a strongly water-repellent and oil-repellent surface. A piece of varnished steel sheet was immersed in the solution, dried and stored at room temperature for 1 day. The varnished surface became oil-repellent and water-repellent.

EXAMPLE 11

30 g. of vinyldimethylchlorosilane and 100 g. of 1-iodo-10-hydroperfluorodecane were pressed at a velocity of 3 g./min. by means of a high-pressure pump through a Hastelloy C tube having a length of 1.5 m. and an inside diameter of 3 mm. The reaction tube was a spiral and was placed in a salt bath at 275° C. At the outlet, the reaction mixture was cooled with water in a short tubular member and was released from pressure by means of a pressure valve which had been set at 200 atm. The reaction product was then dissolved in 500 cc. of dry tetrahydrofurane, and this solution was added dropwise, with agitation and cooling to about 10° C., to a solution of 6 g. of lithium aluminum hydride in ether. After stirring had been continued for 1 hour, the solution was carefully mixed with water and was shaken with a saturated solution of sodium bitartrate, to which some dilute hydrochloric acid had been added, until the aluminum hydroxide was in solution. 500 cc. of trichloroethylene were added, the mixture was shaken, and this phase was separated. After the solution had been dried, the solvent was evaporated; the solution was taken up with 500 cc. of tetrahydrofurane, and 35 g. of vinyltrichlorosilane was dissolved therein. After the addition of 100 mg. of H$_2$PtCl$_6$·6H$_2$O dissolved in tetrahydrofurane, the mixture was shaken and heated under reflux for 12 hours. 40 g. of ethanolamine are then added drop by drop, and the solvent was evaporated. 10 g. of the remaining salt were dissolved in 300 cc. of water, and a piece of cotton cloth was saturated with the solution. The cloth was dried at 110° C. for several minutes. The sample became strongly water-repellent and oil-repellent. A drop of peanut oil was not absorbed. Textiles impregnated in this manner were dirt-repellent and could be cleaned easily.

EXAMPLE 12

14 g. of 1-iodo-10-chloroperfluorodecane were mixed with 3.2 g. of vinyltrichlorosilane, and a 2 mm. thick layer was irradiated with ultraviolet light for 12 hours at a distance of 8 cm. from a 500 watt high-pressure mercury vapor lamp. The reaction mixture was added dropwise to 50 cc. of ethanol and was subsequently shaken with 20 g. of zinc shavings for 3 hours. During this process, some HCl gas was continuously introduced into the mixture. 100 cc. of trichloroethylene were then added, the mixture was mixed with 100 cc. of water and shaken. The trichloroethylene solution was separated, dried with sodium sulfate and filtered. The trichloroethylene was then distilled off, and the residue was dissolved in 50 cc. of triglycol which contained 2 g. of p-toluenesulfonic acid. The solution was then heated to 100° C. for 20 hours. From this mixture, a 4% aqueous solution was prepared which was used to impregnate a piece of filter paper and a piece of cotton cloth. The substrates were squeezed out and dried at 110° C. The paper and the cloth thus treated repelled oil and water. A drop of motor oil did not penetrate the cloth, even after several days.

EXAMPLE 13

4.5 g. of vinyltrichlorosilane, together with 15 g. of 1-iodoperfluorooctane in 50 cc. of diisopropyl ether, were mixed with 0.2 g. of azobis(isobutyronitrile) and were heated to 70° C. for 8 hours. 0.3 g. of azobis(isobutyronitrile) were then added twice, and the mixture was again heated to 70° C. for 8 hours each time. Subsequently, the reaction mixture was added dropwise to 20 cc. of a 1:1 mixture of acetic anhydride and acetic acid, and this mixture, to which 10 g. of zinc shavings had been added, was shaken for 1 hour. The reaction mixture was then treated with 20 g. of glycerine and was heated to 130° C. for 6 hours. During this heating, the entire diisopropyl ether, acetic anhydride and acetic acid was distilled off. 5 g. of this reaction mixture were dissolved with 0.1 g. of octylamine in 100 cc. of water; a piece of cotton cloth was impregnated with this solution, squeezed out and dried at 120° C. for 5 minutes. The impregnation rendered the cloth strongly water-repellent and hydrocarbon-repellent and did not absorb any oil or gasoline.

EXAMPLE 14

In 100 cc. of tetrahydrofurane 13.6 g. of trichlorosilane (SiHCl$_3$) and 42 g. of diallyl, together with 20 mg. of hexachloroplatinic acid, were heated under reflux for 20 hours under exclusion of moisture. The reaction mixture was then rectified, whereby the solvent and excess diallyl were distilled off. The residue produced in vacuo at 104° C. and 37 mm. Hg 13.5 g. of $$CH_2=CH(CH_2)_4SiCl_3$$

corresponding to a yield of 61%.

11 g. of the hexenyltrichlorosilane prepared above were mixed with 28 g. of 1-iodoperfluorooctane and were introduced at a speed of 0.04 g./min. from the top into a reaction tube inclined at an angle of 45°, heated to 320° C. and having a length of 1.5 m. and a width of 10 mm. Located at the bottom outlet of the tube was a cold trap, cooled to −20° C., in which a vacuum of 50 mm. Hg was maintained by means of a vacuum pump. After the entire amount had been passed through the tube, the reaction mixture was dissolved in 100 g. of tetrahydrofurane, and this solution was added drop by drop to 400 cc. of concentrated aqueous ammonia under stirring and cooling. This solution was then shaken with 80 g. of zinc shavings for 1 hour. 300 cc. of trichloroethylene were then added, shaken, separated, dried with sodium sulfate and filtered through a cloth. The trichloroethylene solution was diluted with an additional 1000 cc. of trichloroethylene, and the solution was coated on a cellophane sheet by means of a roller. The sheet was dried briefly at 120° C. The coated side of said sheet was suitable as a packing sheet for foodstuffs or as backing layer for adhesive films. It was also possible to coat the non-coated side of the film with adhesive and to wind up the roll of film. This film roll could be unwound easily, since its reverse side was anti-adhesive.

EXAMPLE 15

14 g. of 1-iodoperfluorodecane were mixed with 4.4 g. of hexenyltrichlorosilane as per Example 14, and a 2 mm. thick layer was irradiated with ultraviolet light for 20 hours with a 500 watt high-pressure mercury vapor lamp. The reaction mixture was then reacted with 70 cc. of methanol and shaken with a large amount of sodium amalgam for 1 hour. After the amalgam had been separated, neutralization was carried out with HCl gas, water was added, and the heavy precipitated liquid was separated after some trichloroethylene had been added. The fluoroalkyltrimethoxysilane was then mixed with 5 g. of ethanolamine and heated, after 1 g. of sodium methoxide had been added, to 100° C. for 20 hours, which caused methanol and trichloroethylene to be distilled off. 2 g. of ammonium chloride were stirred into the reaction mixture, and 5 g. of this suspension were dissolved in 100 cc. of water. A piece of dry beech wood was impregnated with this solution by vacuum impregnation and then dried by being heated to 100° C. for 1 hour. The piece of wood had become strongly water-repellent. Water, oil, and gasoline did not penetrate the wood. A piece of cotton cloth and a spool of diol yarn were saturated with said solution and were dried briefly at 120° C. This cotton cloth and the diol thread became strongly oil-repellent and water-repellent.

EXAMPLE 16

60 g. of diallyl ether and 14 g. of trichlorosilane were reacted, as described in Example 14. At 116° C. and 40 mm. Hg, 15.9 g. of  were obtained corresponding to a yield of 66%.

5 g. of the allyl ether trichlorosilane were mixed with 14 g. of 1-iodoperfluorodecane and were irradiated with ultraviolet light as described in Example 15. This reaction mixture was added drop by drop to 70 cc. of ethanol, and the mixture was shaken with 20 g. of zinc shavings and 5 g. of ammonium chloride for 2 hours. After the zinc had been separated, the mixture was shaken with 150 cc. of trichloroethylene and 100 cc. of water. The separated trichloroethylene solution was concentrated by evaporation, and the residue was mixed with 15 g. of glycol and heated together with 1 g. of p-toluenesulfonic acid to 120° C. for 20 hours while stirring. This solution, dissolved to a concentration of 6% in tetrahydrofurane, was used for the impregnation of leather and textiles. After 24 hours, the dried substrates were oil-repellent and water-repellent. Brief heating by ironing fixed the impregnation more quickly.

EXAMPLE 17

13 g. of 1-iodoperfluorodecane were mixed with 10 g. of diallyl and were irradiated in a thin layer with a 500 watt high-pressure mercury vapor lamp while being stirred vigorously for 20 hours. The reaction mixture was reacted under reflux in isopropyl alcohol with magnesium chips which were activated with iodine. After mixing with hydrochloric acid and trichloroethylene, the heavy organic layer was separated and rectified. At 151° C. and 10 mm. Hg, 7 g. of

were obtained, corresponding to a yield of 58%.

Five grams of the polyfluorohexadecene were dissolved in 50 cc. of dioxane, and 1.5 grams of SiHCl$_3$ were added. 8 mg. of hexachloroplatinic acid, dissolved in a small amount of tetrahydrofurane, were added dropwise to the solution, and the mixture was heated under reflux for 20 hours. After 5 g. of butanol and 30 cc. of trichloroethylene had been added dropwise and after subsequent neutralization of the solution with aqueous caustic soda solution, the organic phase was separated. This impregnating solution was used as additive to varnishes and as a coating for varnish surfaces. The varnishes thereby became oil-repellent and dirt-repellent. Woolen fabrics impregnated with this solution became dirt-repellent after a few days.

EXAMPLE 18

5 g. of diallyl ether were irradiated, as described in Example 17, with 13 g. of 1-iodoperfluorodecane with ultraviolet light. The reaction mixture, together with isopropanol, was stirred with amalgamated coarse aluminum powder for 3 hours. After mixing with hydrochloric acid, rectification of the organic phase at 107° C. and 1 mm. Hg provided 7.9 g. of $CF_3(CF_2)_9(CH_2)_3OCH_2CH=CH_2$ corresponding to a yield of 65%.

6 g. of the $CF_3(CF_2)_9(CH_2)_3OCH_2CH=CH_2$ and 2 g. of methyldiethoxysilane were dissolved in 30 cc. of tetrahydrofurane and heated under reflux with 10 mg. of $$H_2PtCl_6 \cdot 6H_2O$$

for 20 hours. The reaction mixture, to which 2 g. of tetrabutoxysilane and 0.5 g. of benzyl trimethyl ammonium hydroxide were added, was diluted with 150 cc. of trichloroethylene. Porous materials such as paper, textiles, wood and pieces of leather, impregnated with this solution and dried, were stored for about forty-eight hours after which they became oil-repellent and water-repellent and, hence, dirt-repellent. In some cases, the storage time was shortened by heating the substrates to 120° C. for 10 minutes.

EXAMPLE 19

Ethylene was passed with a velocity of 1.2 mmols/min. through 1-iodoperfluorododecane at a temperature of 175° C. This gas, saturated with 1-iodoperfluorododecane vapor at that temperature, was passed through a glass tube having a length of 1.5 m. and an inside diameter of 10 mm. and heated to 330° C. At the outlet of the tube, 10 g. of reaction mixture were cooled to 20° C. in a cold trap with water and were separated. The resulting 1-iodo-1,1,2,2-tetrahydroperfluorotetradecane was dissolved in 20 cc. of xylene while heating. This solution was stirred drop by drop into a suspension of 4 g. of NaOH powder in 30 cc. of diethylene glycol dimethyl ether. Over a period of 5 hours, the temperature was slowly increased to the reflux temperature of the xylene. 100 cc. of water were then added, and the organic phase was separated, dried and rectified. The residue was 7.8 g. of 1,1,2-trihydroperfluorotetradecane $(CF_3(CF_2)_{11}CH=CH_2)$.

6.5 g. of 1,1,2-trihydroperfluorotetradecane, together with 2.5 g. of liquid polymethylsiloxane, corresponding to the product DC1107 of the Dow Corning Corp., were dissolved in 30 cc. of dioxane; after 10 mg. of hexachloroplatinic acid in tetrahydrofurane had been added, the mixture was heated under reflux for 20 hours. The dioxane was then distilled off, and the residue was dissolved in 150 cc. of trichloroethylene. This solution was an excellent impregnating agent for textiles of every kind, paper, leather, wood, plastic sheets, and varnished surfaces. The solution imparted to the substrates an oil-repellent and water-repellent property; the surfaces became anti-adhesive and adhesive-repellent. Even when used undiluted, as additive to polymerization or reaction varnishes, such as for example, epoxide, polyester, isocyanate or silicone resin varnishes, the oil- and dirt-repellent properties of the varnishes could be improved substantially. Polycondensation varnishes such as phenol, urea, and melamine resin varnishes are also suitable for this purpose. When a piece of polyester fabric was saturated with this solution and dried in a moist atmosphere for several hours, the fabric became strongly hydrocarbon- and water-repellent. Oil, gasoline, heptane, alcohol, and drops of water did not penetrate the fabric. A sewing thread impregnated with this solution slid more easily through the material and the eye of the needle, so that there was less tension during sewing. In addition, the thread became hydrophobic and oleophobic.

EXAMPLE 20

As described in Example 19, 1.5 mmols/min. of acetylene were passed through liquid 1-iodoperfluorooctane at a temperature of 120° C., so that the gas was saturated with 1-iodoperfluorooctane vapor at that temperature. This gas mixture was heated to 330° C. and kept at this temperature in a reaction tube under atmospheric pressure with a residence time of 50 seconds, as described in Example 22. After the reaction gas had been cooled to room temperature, 15 g. of 1-iodo-1,2-dihydroperfluorodecene-1 were obtained from the cold trap corresponding to a yield of 68%. This product was dehydroiodinated in diethyleneglycol dimethyl ether at 100° C. for 3 hours with pulverized KOH with vigorous stirring. After cooling, the reaction mixture was mixed with water and chloroform, the perfluorooctylacetylene was precipitated in the heavier chloroform layer, and the solution was dried. The chloroform was expelled from the solution by means of a short column, and the residue was taken up with 30 g. of dioxane. 4 g. of trichlorosilane were dissolved in this solution, 10 mg. of hexachloroplatinic acid were added, and the mixture was heated under reflux for 20 hours. The resulting fluoroalkylchlorosilane mixture consisting of $$C_8F_{13}CH=CHSiCl_3$$

and $$C_8F_{13}CHCH_2SiCl_3 \atop | \atop SiCl_3$$

was slowly mixed with 50 c. of methanol. The resulting fluoroalkylmethoxysilanes were mixed with 8 g. of ethanolamine, in which 0.2 g. of sodium were dissolved, and heated to 100° C. for 10 hours. This mixture, in a 10% methylene chloride solution, was poured into a spray container, and Freon 114 was pressed in. This container was used to spray textile fabrics of every kind, which, after prolonged storing become strongly oil-repellent, dirt-repellent and water-repellent. A linen tablecloth treated in this manner repelled salad oil in the form of beads.

EXAMPLE 21

The fluoroalkylmethoxysilane, obtained according to Example 20, was mixed with ethanolamine amounting to 50% of its weight and was heated with a small amount of sodium methoxide to 110° C. for about 20 hours. The mixture was then dissolved in water to a concentration of 3%. This solution was used to moisten textile fabrics of many kinds by dipping, spraying, and printing. After the fabric had been dried, a brief heating at a temperature in excess of 100° C. by ironing or in a clamping frame was carried out for the purpose of fixing the solution more rapidly. The resulting textiles were oil-repellent, dirt-repellent and water-repellent and were, therefore, of increased value in use.

EXAMPLE 22

50 g. of 1-iodoperfluoroheptane were mixed with 30 g. of vinyltrichlorosilane and reacted thermally according to the process described in U.S. application Ser. No. 455,615, filed May 13, 1965. For this purpose, the mixture was dropped at a velocity of 0.35 cc./min. into a slightly inclined glass tube having a length of 900 mm. and an inside diameter of 10 mm. and heated to 340° C. The escaping vapors were condensed and contained, in addition to 20% of unreacted perfluoroalkyliodide and the excess vinyltrichlorosilane, a mixture of $$C_7F_{15}CH_2CHISiCl_3$$

and $$C_7F_{15}CH=CHSiCl_3$$

After the unreacted reaction components had been distilled off, the reaction mixture boiling at a temperature above 100° C. at 20 mm. Hg was dissolved in 200 cc. of diisopropyl ether, and this solution was slowly added, drop by drop, to a vigorously stirred mixture of 2300 g. of 0.6% sodium amalgam and 50 g. of ethylene glycol. The mixture was then stirred with sodium amalgam at 40° C. and, after neutralization, the diisopropyl ether was distilled off with gaseous HCl. The residue containing $$C_7F_{15}CH_2CH_2Si(OCH_2CH_2OH)_3$$

was dissolved in water. Such a 0.5% aqueous solution was used to impregnate many substrates of fibrous, porous and even smooth surface to render them strongly oleophobic and hydrophobic. For this purpose, it was advantageous to harden the impregnation by heating to about 100–150° C. for 4 minutes to 1 hour, or by long storing after the material had been immersed, saturated or printed. In order to produce an impregnating agent which was free of iodine a neutral solution of the residue, obtained after reduction and evaporation of the diisopropyl ether, in isopropanoyl or other polar liquid was allowed to run over a chloride charged anion exchange resin, which advantageously had been caused to swell with alcohol instead of with water. This produced a water-soluble iodide-free impregnating agent which showed no tendency to precipitate in water, even after 20 days. The resulting anhydrous concentrate, the alcoholic solvent of which was replaced with tetrahydrofuran, was mixed with 25 g. of epichlorohydrin and stirred with 9 g. of sodium oxide powder at 40° C. for two hours. Neutralization was then carried out carefully in the cold state with HCl-gas. This method produced a fluorosilicon product, whose free hydroxy group on the alkoxy radical was partly replaced by glycidyl ether groups. These liquid compounds were completely water-soluble; in addition to their strong oleophobic impregnating effect, they had the property of making cotton and spun-rayon fabrics creaseproof.

EXAMPLE 23

50 g. of 1-iodoperfluoroheptane were mixed with 28 g. of vinyl methyl dichlorosilane and reacted thermally in accordance with the procedure set forth in Example 22 to form a mixture of $$C_7F_{15}CH_2CHISi(CH_3)Cl_2$$

and $$C_7F_{15}CH=CHSi(CH_3)Cl_2$$

After the unreacted reaction components had been distilled off, the reaction mixture boiling at a temperature above 100° C. at 20 mm. Hg was dissolved in 200 cc. of diisopropyl ether, and this solution was slowly added, drop by drop, to a vigorously stirred mixture of 2300 g. of 0.6% sodium amalgam and 50 g. of 1,3-trimethylene glycol. The mixture was then stirred with sodium amalgam at 40° C. and, after neutralization the diisopropyl ether was distilled off with gaseous HCl. The residue containing $$C_7F_{15}CH_2CH_2Si(OCH_2CH_2CH_2OH)_3$$

was dissolved in water. Such a 0.5% aqueous solution was used to impregnate many substrates to render then strongly oleophobic and hydrophobic as set forth in Example 22.

EXAMPLE 24

50 g. of 1-iodoperfluoroheptane were mixed with 30 g. of vinyltrichlorosilane and reacted thermally in accordance with the procedure set forth in Example 22 to form a mixture of $$C_7F_{15}CH_2CHISiCl_3$$

and $$C_7F_{15}CH=CHSiCl_3$$

After the unreacted reaction components had been distilled off, the reaction mixture boiling at a temperature above 100° C. at 20 mm. Hg was dissolved in 200 cc. of diisopropyl ether, and this solution was slowly added, drop by drop, to a vigorously stirred mixture of 2300 g. of 0.6% sodium amalgam and 70 g. of glycerin. The mixture was then stirred with sodium amalgam at 40° C. and, after neutralization the diisopropyl ether was distilled off with gaseous HCl. The residue containing $$C_7F_{15}CH_2CH_2Si[OCH_2CH(OH)CH_2OH]_3$$

was dissolved in water. Such a 0.5% aqueous solution was used to impregnate many substrates to render them strongly oleophobic and hydrophobic as set forth in Example 22.

EXAMPLE 25

50 g. of 1-iodoperfluoroheptane were mixed with 30 g. of vinyltrichlorosilane and reacted thermally in accordance with the procedure set forth in Example 22 to form a mixture of $$C_7F_{15}CH_2CHISiCl_3$$

and $$C_7F_{15}CH=CHSiCl_3$$

After the unreacted reaction components had been distilled off, the reaction mixture boiling at a temperature above 100° C. at 20 mm. Hg was dissolved in 200 cc. of diisopropyl ether, and this solution was slowly added, drop by drop, to a vigorously stirred mixture of 2300 g. of 0.6% sodium amalgam and 100 g. of diglycerin. The mixture was then stirred with sodium amalgam at 40° C. and, after neutralization the diisopropyl ether was distilled off with gaseous HCl. The residue containing $$C_7F_{15}CH_2CH_2Si[OCH_2CH(OH)CH_2OCH_2CH(OH)CH_2OH]_3$$

was dissolved in water. Such a 0.5% aqueous solution was used to impregnate many substrates to render them strongly oleophobic and hydrophobic as set forth in Example 22.

EXAMPLE 26

Twenty-five grams of 1-iodoperfluoroheptane were mixed with 16 g. of vinyltrichlorosilane and passed, as a gas, through a glass reaction tube having a length of 900 mm. and a diameter of 10 mm. for a residence time of 30 sec. at 340° C. and 1 atm. in accordance with the process of U.S. application Serial No. 455,615, filed May 13, 1965. After the excess starting material had been distilled off in a vacuum of 20 mm. Hg, the reaction product, condensed by cooling, was dissolved in 100 cc. of diisopropyl ether and was added, drop by drop, to a vigorously stirred mixture of 70 cc. of methanol with excess liquid sodium amalgam. Stirring was continued for about 1 hour, whereupon a check was carried out to determine whether the mercury still contained sodium; this was determined by hydrogen evolution of an amalgam sample with dilute acetic acid. The sample reduced in this manner was neutralized with gaseous HCl, after the amalgam has been separated, and was then shaken out with 200 cc. of water. The aqueous solution now contained all sodium halides, from which the iodine can be recovered. The ethereal solution was again washed with water and was then dried with calcium chloride. 30 g. of diglycol together with 30 cc. of tetrahydrofurane were added; after addition of about 0.1 g. of sodium methoxide the mixture was heated to 100° C. under pressure and vigorous shaking. After cooling and emptying the pressure vessel, the solvent was distilled off at 100° C., expelling released alcohol, and, after cooling, the catalyst was rendered inactive by neutralization. The resulting liquid compound of the formula $$C_7F_{15}CH_2CH_2Si[(OCH_2CH_2)_2OH]_3$$

was completely soluble in water and in aqueous solutions of lower alcohols, as well as in other polar solvents. These aqueous solutions were stable for more than 30 days and free of flocculation permanently and, when used in concentrations as low as 0.2% showed a high oleophobic and hydrophobic impregnating effect which rendered the substrates strongly dirt-repellent and antiadhesive. The substrates, for example, textiles, paper, sheets, and leather, were wetted by immersing, printing and spraying, dried and heated, if possible for several minutes up to several hours, to 90° C. to 150° C. or higher in order to condense the material. When alkali or quaternary ammonium bases in an amount of 1% or less were added or applied subsequently, they substantially reduced the hardening temperature or the hardening time of the silicon. A piece of cotton poplin, a piece of filter paper and a piece of regenerated cellulose film were immersed in a 1% aqueous solution of this sample, dried by being heated to 130° C. and kept at this temperature for about 10 minutes. A piece of suede, dipped into the same solution, was squeezed out and dried and was sprayed with an 0.1% alcoholic benzyltrimethylammonium hydroxide solution. After being stored for 1 day, the leather was strongly oil-, dirt- and water-repellent. The piece of poplin and the filter paper, as well as the film had the same properties. The hydrophobic effect improved substantially after the material had been washed with water once, so that wetting was barely possible even under drastic conditions. This effect persisted even after repeated washing or chemical cleaning. The film was strongly adhesive-repellent and, if impregnated on only one side by printing, was an excellent starting material for the production of adhesive films and strips.

EXAMPLE 27

25 g. of 1-iodoperfluoroheptane were reacted with 16 g. of vinylmethyldichlorosilane and the resulting product was reduced and methoxylated with sodium amalgam and methanol and dried with calcium chloride in accordance with the procedure set forth in Example 29. 40 g. of triglycol together with 30 cc. of tetrahydrofurane were added to the fluoroalkylmethyldimethoxysilane. After addition of about 0.1 g. of p-toluene sulfonic acid the mixture was heated to 100° C. under pressure and vigorous shaking. After cooling and emptying the pressure vessel, the solvent was distilled off at 100° C., and, after cooling, the catalyst was rendered inactive by neutralization. The resulting liquid compound of the formula

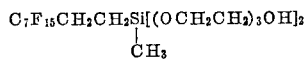

was completely soluble in water and in aqueous solutions of lower alcohols, as well as in other polar solvents. These aqueous solutions were stable for more than 30 days and free of flocculation permanently and when used in concentrations as low as 0.2% showed a high oleophobic and hydrophobic impregnating effect which rendered the substrates strongly dirt-repellent and antiadhesive.

EXAMPLE 28

26 g. of 1-iodo-8-chloroperfluorooctane were reacted with 16 g. of vinyltrichlorosilane and the resulting product was reduced and methoxylated with sodium amalgam and methanol and dried with calcium chloride in accordance with the procedure set forth in Example 26. 25 g. of triglycol monomethyl ether together with 30 cc. of tetrahydrofurane were added to the fluorochloralkyltrimethoxysilane. After addition of about 0.1 g. of quarternary ammonium bases the mixture was heated to 100° C. under pressure and vigorous shaking. After cooling and emptying the pressure vessel, the solvent was distilled off at 100° C., and, after cooling, the catalyst was rendered by inactive by neutralization. The resulting liquid compound of the formula $$CF_2Cl(CF_2)_7CH_2CH_2Si[(OCH_2CH_2)_3OCH_3]_3$$

was completely soluble in water and in aqueous solutions of lower alcohols, as well as in other polar solvents. These aqueous solutions were stable for more than 30 days and free of flocculation permanently and, when used in concentrations as low as 0.2%, showed a high oleophobic and hydrophobic impregnating effect which rendered the substrates strongly dirt-repellent and antiadhesive.

EXAMPLE 29

43 g. of 1-iodoperfluorotetradecane were reacted, as described in Example 26, with 16 g. of vinyltrichlorosilane; after the excess vinyltrichlorosilane had been distilled off, the reaction product was converted at 100° C. and 10 mm. Hg, as in Example 26, to fluoroalkyltrimethoxysilane and reduced. The resulting iodine-free silane was catalytically transesterified with 60 g. of polyglycol having a molecular weight of 400 and 0.2 g. of sodium methoxide and 80 cc. of tetrahydrofurane as dissolving intermediary, in the manner described in Example 26, and was subsequently neutralized with HCl. The resulting product which had the formula $$C_{14}F_{29}CH_2CH_2Si[(OCH_2CH_2)_nOH]_3$$

was infinitely soluble in water. A 1% aqueous solution was extremely stable and was an excellent impregnating agent for textiles, paper, leather, and other substrates. This solution had a high wetting power and foamed slightly. Epoxy compounds may be admixed with the solution for creaseproof impregnation. As described in Example 26, the silicon was hardened on the substrate so as to be washproof and imparted to the substrate a high hydrocarbon- and water-repellent effect. Gasoline, heptane, cyclohexane and water did not wet the substrate. This produced an excellent dirt-repellent effect. These aqueous solutions are more economical to use than any other fluoro-resins with perfluorocarbon chains of $C_8$ and less.

EXAMPLE 30

48 g. of 1-iodoperfluorohexadecane were reacted, as described in Example 26, with 16 g. of vinyltrichlorosilane; after the excess vinyltrichlorosilane had been distilled off, the reaction product was converted at 100° C. and 10 mm. Hg, as in Example 26, to fluoroalkyltrimethoxysilane and reduced. The resulting iodine-free silane was catalytically transesterified with 60 g. of $HO[C_2H_4O]_{10}$—$CH_3$ and 0.2 g. of sodium methoxide and 80 cc. of tetrahydrofurane as dissolving intermediary, in the manner described in Example 26, was subsequently neutralized with HCl. The resulting product of the formula $$C_{16}F_{33}CH_2CH_2Si[(OCH_2CH_2)_{10}OCH_3]_3$$

was infinitely soluble in water. A 1% aqueous solution was extremely stable and was an excellent impregnating agent for textiles, paper, leather, and other substrates.

EXAMPLE 31

45 g. of 1-iodoperfluorooctane were reacted with 30 g. of vinyltrichlorosilane according to the method described in Example 26. After the unreacted starting material had been distilled off, the resulting fluoroalkyltrichlorosilane was reacted with 50 g. of acetic anhydride and was boiled for a short time. 30 g. of glacial acetic acid were added, as well as 200 g. of tetrahydrofurane as solvent. This solution was shaken with zinc shavings for 3 hours, whereupon all of the solvent, acetic anhydride and glacial acetic acid was distilled off and the iodine was set free from the distillate by oxidate. 100 g. of polytetramethylene glycol ether having a mean molecular weight of 350 were added, and the acetic acid that was set free was distilled off in vacuo. The resulting product of the formula $$C_8F_{17}CH_2CH_2Si[(OCH_2CH_2CH_2CH_2)_nOH]_3$$

was water-soluble and was unusually suitable, in the form of an aqueous dilute solution, as an impregnating agent to render textiles and synthetic leather oleophobic according to the procedure described in Example 26.

EXAMPLE 32

45 g. of 1-iodoperfluorooctane were reacted with 28 g. of vinylmethyldichlorosilane according to the method described in Example 26. After the unreacted starting material had been distilled off, the resulting fluoroalkyl-methyldichlorosilane was reacted with 50 g. of acetic anhydride and was boiled for a short time. 30 g. of glacial acetic acid were added, as well as 200 g. of tetrahydrofurane as solvent. This solution was shaken with zinc shavings for 3 hours, whereupon all of the solvent, acetic anhydride and glacial acetic acid was distilled off and the iodine was set free from the distillate by precipitation with plumbous acetate after the zinc had been separated. Excess lead was precipitated with ammonium chloride. After the precipitate had been filtered off and all solvents had been distilled off, 25 g. of glycidol were added, and the acetic acid that had been set free was distilled off in vacuo. The resulting product of the formula

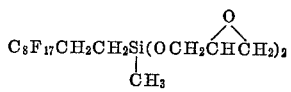

was water-soluble and was unusually suitable, in the form of an aqueous dilute solution, as an impregnating agent to render textiles and synthetic leather oleophobic according to the procedure described in Example 26.

EXAMPLE 33

42 g. of 1-iodo-8-hydroperfluorooctane were reacted with 30 g. of vinyltrichlorosilane according to the method described in Example 26. After the unreacted starting material had been distilled off, the resulting fluoroalkyltrichlorosilane was reacted with 50 g. of acetic anhydride and was boiled for a short time. 30 g. of glacial acetic acid were added, as well as 200 g. of tetrahydrofurane as solvent. This solution was shaken with zinc shavings for 3 hours, whereupon all of the solvent, acetic anhydride and glacial acetic acid was distilled off and the iodine was set free from the distillate by oxidation. 60 g. of triglycol monoacetate were added, and the acetic acid that had been set free was distilled off in vacuo. The resulting product of the formula $$CF_2H(CF_2)_7CH_2CH_2Si[(OCH_2CH_2)_3OC(O)CH_3]_3$$

was water-soluble and was unusually suitable, in the form of an aqueous dilute solution, as an impregnating agent to render textiles and synthetic leather oleophobic according to the procedure described in Example 26.

EXAMPLE 34

65 g. of 1-iodoperfluorodecane was reacted with 30 g. of vinyltrichlorosilane according to the process of U.S. application Ser. No. 455,615 at 330° C. and a residence time of 40 seconds. After the excess starting material had been distilled off, the reaction product was mixed with 200 cc. of diisopropyl ether and, as described in Example 26, was converted to the trimethoxysilane and reduced. It was washed with water, and the solvent was evaporated. 100 cc. of a mixture of tetrahydrofurane and diisopropyl ether in a 1:1 ratio, were added, and 30 g. of beta-hydroxypropionic acid were dissolved therein. After 0.2 g. of p-toluene sulfonic acid had been added, the mixture was heated in an autoclave to 100° C. for two hours while stirring. After the mixture had been cooled and buffered with some sodium acetate, a water-soluble fluoroalkylsilane of the formula $$C_{10}F_{21}CH_2CH_2Si(OCH_2CH_2COOH)_3$$

was obtained whose aqueous and non-aqueous solutions were excellent impregnating agents. When this solution was neutralized with some ammonia, strongly wetting impregnating solutions were obtained. They were especially suitable for heavy textiles which were treated as described in Example 26.

EXAMPLE 35

75 g. of telomer product derived from pentafluoroiodoethane and chlorotrifluoroethylene, which had a carbon chain of 10 and was obtained according to the process of U.S. application Ser. No. 417,227, was reacted with 32 g. of allyltrichlorosilane according to the process of U.S. application Ser. No. 455,615, at 330° C. and a residence time of 40 seconds. After the excess starting material had been distilled off, the reaction product was mixed with 200 cc. of diisopropyl ether and, as described in Example 26, was converted to the trimethoxysilane and reduced. It was washed with water, and the solvent was evaporated. 100 cc. of a mixture of tetrahydrofurane and diisopropyl ether in a 1:1 ratio were added, and 25 g. of glycolic acid were dissolved therein. After 0.2 g. of p-toluene sulfonic acid had been added, the mixture was heated in an autoclave to 100° C. for two hours while stirring. After the mixture had been cooled and buffered with some sodium acetate, a water-soluble fluoroalkylsilane of the formula $$CF_3CF_2(CFClCF_2)_4(CH_2)_3Si(OCH_2COOH)_3$$

was obtained whose aqueous and non-aqueous solutions were excellent impregnating agents. When this solution was neutralized with some ammonia, strongly wetting impregnating solutions were obtained. They were especially suitable for heavy textiles which were treated as described in Example 26.

EXAMPLE 36

65 g. of 1-iodoperfluorooctane were reacted with 30 g. of allyl trichlorosilane as described in Example 26. After the excess starting material had been distilled off, the resulting addition product was mixed with 100 cc. of tetrahydrofurane and was added, slowly and drop by drop, with stirring to a mixture containing 110 g. of ethoxylated glycolic acid having a mean molecular weight of 260, zinc shavings, ammonium bromide and 50 cc. of tetrahydrofurane. After stirring had continued for two hours, the solution was filtered off and passed over a dehydrated, chloride-charged anion exchange resin which had been caused to swell with tetrahydrofurane. This produced a water-soluble, iodine-free $$C_8F_{17}(CH_2)_3Si[(OCH_2CH_2)_nOCH_2COOH]_3$$

solution which, when dissolved in water, produced good olephobic and hydrophobic effects on textiles, paper and other substrates after a hardening time of 5 minutes at 130° C. These aqueous solutions remained stable for many days.

EXAMPLE 37

63 g. of 1-iodo-8-hydroperfluorooctane were reacted with 30 g. of vinylmethyldichlorosilane as described in Example 26. After the excess starting material had been distilled off, the resulting addition product was mixed with 100 cc. of tetrahydrofurane and was added, slowly and drop by drop, with stirring to a mixture containing 60 g. of triglycol monoacetate, zinc dust and 50 cc. of tetrahydrofurane. After stirring had continued for two hours, the solution was filtered off and passed over a dehydrated, chloride-charged anion exchange resin which had been caused to swell with tetrahydrofurane. This produced a water-soluble, iodine-free

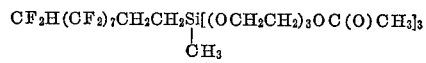

solution which when dissolved in water, produced good oleophobic and hydrophobic effects on textiles, paper and other substrates after a hardening time of 5 minutes at 130° C. These aqueous solutions remained stable for many days.

EXAMPLE 38

65 g. of 1-iodoperfluorodecane were reacted with 30 g. of vinyltrichlorosilane as described in Example 26. After the excess vinyltrichlorosilane had been distilled off, this reaction product was diluted with 200 cc. of diisopropyl ether and was added, drop by drop, with vigorous stirring, to a mixture of 100 cc. of methanol and excess sodium amalgam. After stirring had continued for 1 hour, separation from the amalgam was carried out and neutralization was effected with gaseous HCl. The solution was shaken with water twice and was dried. After 120 cc. of diisopropyl ether had been distilled off, the mixture was diluted with 70 cc. of tetrahydrofurane, whereupon 25 g. of monoethanolamine together with 1 g. of sodium methoxide were added. The mixture was then heated to 100° C. in a rocking autoclave for two hours. The entire solvent and the alcohol that had been set free was blown off at this temperature, whereupon the mixture was reheated for two hours. The reaction product was then cooled and neutralized with gaseous HCl to a pH of 8.5. The liquid product of the formula $$C_{10}F_{21}CH_2CH_2Si(OCH_2CH_2NH_2)_3$$

was completely water soluble. Its aqueous solutions were very stable and imparted strongly dirt-repellent and oil-repellent properties to textiles, wool, paper, leather, wooden parts and varnished articles, as well as to metallic surfaces, after wetting and drying.

To achieve quicker hardening, the substrates wetted with 3% to 0.3% solutions were heated to temperatures ranging from 80 to 250° C. Gasoline was no longer able to penetrate cotton fabrics impregnated in this manner. The substrates remained strongly hydrophobic, especially after being washed with water once. These solutions were unusually suitable as mold release agents for vulcanizing molds and other molds.

EXAMPLE 39

65 g. of 1-iodoperfluorodecane were reacted with 30 g. of vinylmethyldichlorosilane as described in Example 29. After the excess vinylmethyldichlorosilane had been distilled off, this reaction product was diluted with 200 cc. of diisopropyl ether and was added, drop by drop, with vigorous stirring, to a mixture of 100 cc. of methanol and excess sodium amalgam. After stirring had continued for 1 hour, separation from the amalgam was carried out and neutralization was effected with gaseous HCl. The solution was shaken with water twice and was dried. After 120 cc. of diisopropyl ether had been distilled off, the mixture was diluted with 70 cc. of tetrahydrofurane, whereupon 60 g. of diethanolamine together with 1 g. of sodium methoxide were added. The mixture was then heated to 100° C. in a rocking autoclave for two hours. The entire solvent and the alcohol that had been set free was blown off at this temperature, whereupon the mixture was reheated for two hours. The reaction product was then cooled and neutralized with gaseous HCl to a pH of 8.5. The liquid product of the formula $$C_{10}F_{21}CH_2CH_2Si(OCH_2CH_2NHCH_2CH_2OH)_2$$
$$|$$
$$CH_3$$

was completely water-soluble. Its aqueous solutions were very stable and imparted strongly dirt-repellent and oil-repellent properties to textiles, wool, paper, leather, wooden parts and varnished articles, as well as to metallic surfaces, after wetting and drying.

EXAMPLE 40

70 g. of 1-iodo-10-bromoperfluorodecane were reacted with 30 g. of vinyltrichlorosilane as described in Example 26. After the excess vinyltrichlorosilane had been distilled off, this reaction product was diluted with 200 cc. of diisopropyl ether and was added, drop by drop, with vigorous stirring, to a mixture of 100 cc. of methanol and excess sodium amalgam. After stirring had continued for 1 hour, separation from the amalgam was carried out and neutralization was effected with gaseous HCl. The solution was shaken with water twice and was dried. After 120 cc. of diisopropyl ether had been distilled off, the mixture was diluted with 70 cc. of tetrahydrofurane, whereupon 100 g. of triethanolamine together with 1 g. of sodium methoxide were added. The mixture was then heated to 100° C. in a rocking autoclave for two hours. The entire solvent and the alcohol that had been set free was blown off at this temperature, whereupon the mixture was reheated for two hours. The reaction product was then cooled and neutralized with gaseous HCl to a pH of 8.5. The liquid product of the formula $$CF_2Br(CF_2)_9CH_2CH_2Si[OCH_2CH_2N(CH_2CH_2OH)_2]_3$$

was completely water-soluble. Its aqueous solutions were very stable and imparted strongly dirt-repellent and oil-repellent properties to textiles, wool, paper, leather, wooden parts and varnished articles, as well as to metallic surfaces, after wetting and drying.

As will be apparent to those skilled in the art, numerous modifications and variations of the embodiments illustrated above may be made without departing from the spirit of the invention or the scope of the following claims.

I claim:

1. Fluoroalkyl silicon compounds of the formula $$(RR')_mR''_nSiZ_{4-(m+n)}$$

in which R is $X(CF_2)_p$—, where X is hydrogen, chlorine or fluorine and $p$ is 6–18, R' is —$(CH_2)_q$—, —CH=CH— or —$C_3H_6OC_3H_6$—, where $q$ is 2–6, $m$ is 1–2, R'' is lower alkyl or lower alkenyl, $n$ is 1–2, Z is an organooxy group derived from an aliphatic hydroxy compound selected from the class consisting of a glycol, a glycol ether, a polyol, a polyol ether, a hydroxycarboxylic acid and an alkanolamine.

2. The fluoroalkyl silicon compound of claim 1 wherein the glycol is ethylene glycol.

3. The fluoroalkyl silicon compound of claim 1 wherein the glycol ether is ethylene glycol monomethyl ether.

4. The fluoroalkyl silicon compound of claim 1 wherein the polyol is a polyglycol having a molecular weight of about 400.

5. The fluoroalkyl silicon compound of claim 1 wherein the hydoxycarboxylic acid is hydroxyacetic acid.

6. The fluoroalkyl silicon compound of claim 1 wherein the alkanolamine is monoethanolamine.

References Cited

UNITED STATES PATENTS

| | | | |
|---|---|---|---|
| 2,911,428 | 11/1959 | Tarrant | 260—448.2 |
| 2,922,823 | 1/1960 | Tarrant | 260—448.2 X |
| 2,961,425 | 11/1960 | Pierce et al. | 260—448.2 X |
| 2,979,519 | 4/1961 | Pierce et al. | 260—448.2 |
| 3,002,951 | 10/1961 | Johannson | 260—448.2 X |

TOBIAS E. LEVOW, Primary Examiner.

P. F. SHAVER, Assistant Examiner.

U.S. Cl. X.R.

106—13; 117—121, 138.5, 142, 143, 147, 152; 252—8.57, 8.6; 260—348, 448.2

PO-1050
(5/69)

UNITED STATES PATENT OFFICE
CERTIFICATE OF CORRECTION

Patent No. 3,450,738    Dated June 17, 1969

Inventor(s) Walter Blöchl

It is certified that error appears in the above-identified patent and that said Letters Patent are hereby corrected as shown below:

Column 12, line 36 "50c" should read "50cc".

Column 12, line 66 "0.35 cc/min" should read "0.36 cc/min".

Column 15, line 67, Example 28 "by inactive" should read "inactive".

Column 16, line 62, Example 31 "oxidate" should read "oxidation".

SIGNED AND
SEALED
APR 28 1970

(SEAL)
Attest:

Edward M. Fletcher, Jr.
Attesting Officer

WILLIAM E. SCHUYLER, JR.
Commissioner of Patents